United States Patent [19]
Wurzer

[11] Patent Number: 5,463,798
[45] Date of Patent: Nov. 7, 1995

[54] SELF-LOCKING CARABINER

[76] Inventor: Franz Wurzer, Fachschulgasse 18, A-6166 Fulpmes/Tirol, Austria

[21] Appl. No.: 143,432

[22] Filed: Oct. 26, 1993

[30] Foreign Application Priority Data

Nov. 2, 1992 [AT] Austria .................................. 2157/92

[51] Int. Cl.$^6$ ..................................................... F16B 45/02
[52] U.S. Cl. ......................... 24/599.5; 24/573.5; 24/600.1
[58] Field of Search .............................. 24/599.5, 600.1, 24/600.3, 573.5, 598.2

[56] References Cited

U.S. PATENT DOCUMENTS 527,286 10/1894 Perleins et al. ...................... 24/600.1

FOREIGN PATENT DOCUMENTS

0362087A1 4/1990 European Pat. Off. .
0466613A2 1/1992 European Pat. Off. .

Primary Examiner—James R. Brittain
Attorney, Agent, or Firm—Friedrich Kueffner

[57] ABSTRACT

A carabiner includes a C-shaped, load-bearing hook member and a closing member mounted at an end of the hook member. The closing member can be pivoted in the plane of the hook member and is held in a closing position by the force of a spring. In the closing position, the closing member rests against the other free end of the hook member. A two-arm lever is mounted at the inside of a portion of the hook member adjacent the free end thereof. The two-arm lever is pivotable about an axis extending perpendicularly to the plane of the hook member. The shape of the two-arm lever essentially is the same as the shape of the portion of the hook member adjacent the free end thereof. In the unloaded state of the carabiner, the arm of the two-arm lever adjacent the free end of the hook member rests as a result of the force of a spring against the hook member and an end face of the two-arm lever extends close to the end of the closing member in the closing position. The other arm of the lever is spaced apart from the portion of the hook member opposite this other arm. When the lever is pivoted, the end face of the arm adjacent the free end of the hook member extends into the pivoting range of the free end of the closing member in the closing position thereof and, as a result, locks the closing member in the closing position thereof.

8 Claims, 2 Drawing Sheets

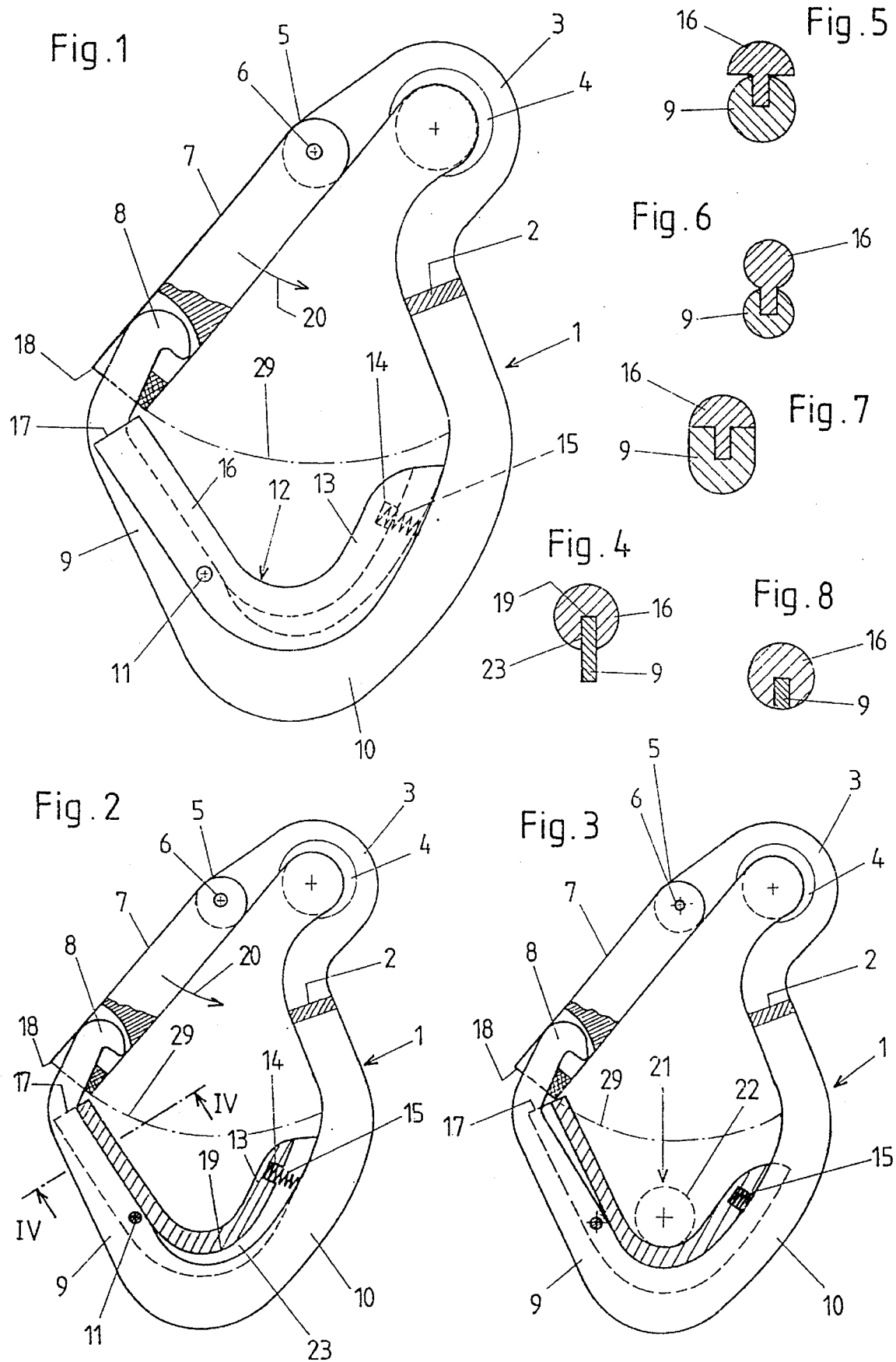

SELF-LOCKING CARABINER

BACKGROUND OF THE INVENTION

1. Field of the Invention

The present invention relates to a carabiner including an essentially C-shaped load-bearing hook member and a closing member mounted at an end of the hook member so as to be pivotable in the plane of the hook member. The closing member is maintained in a closing position by means of a spring. In the closing position, the closing member rests against the inner side of the other free end of the hook member. Mounted on the portion of the hook member adjacent the free end thereof is at the inside of the hook portion a lever which has a shape which essentially corresponds to the shape of the hook portion adjacent the free end thereof and is pivotable about an axis which extends perpendicularly to the plane of the hook member.

2. Description of the Related Art

Carabiners of the above-described type are known. They are used for recreational activities as well as for industrial purposes. In simple embodiments of such carabiners, the closing member is held in the closing position only by means of the force of the spring acting on the closing member.

However, other embodiments of carabiners have become known in which the closing member is mechanically secured in the closing position, i.e., the closing member is blocked in the closing position. In an embodiment of this type, a thread with a threaded sleeve is arranged on the closing member. When the carabiner is closed, the threaded sleeve is turned until it overlaps in a positively engaging manner the abutting end portions of closing member and hook member. In accordance with another embodiment of this type, a rotatable sleeve is mounted on the free end of the closing member. The sleeve has a recess which can be moved by rotating the sleeve into and out of the pivoting plane of the closing member, so that the abutting portions or ends of the closing member and the hook member are either overlapped by this sleeve or can be freely moved relative to each other through the recess.

In another embodiment, a spring-loaded sleeve is mounted on the closing member. A hinge-like connection between the hook member and the closing member is overlapped in a positively engaging manner by the sleeve and the closing member is prevented from pivoting by means of the sleeve. By axially displacing the sleeve along the bolt-like closing member, the hinge-like connection is released, so that the closing member can be pivoted. When the spring-loaded sleeve is released, the sleeve is pushed back into the locking position by the force of the spring acting on the sleeve.

All of the above-described embodiments have the disadvantage that both hands must be used when the described locking members of the carabiners are to be actuated. In addition, the actuation of the locking members requires a conscious act of the user. Thus, it is readily apparent that this represents a disadvantage, particularly if such carabiners are to be used in extreme situations, as it is the case, for example, in alpine sports activities, such as mountain climbing.

The above-described disadvantages are obviated by the carabiner disclosed in European Application 466,613. The closing member of this carabiner is constructed in such a way that one of the force transmitting members to be hooked or supported by the carabiner is fastened directly to the closing member. If a load is applied to the force transmitting member, the closing member is automatically pulled into the closing position without requiring a manual and/or conscious act by the user. However, the carabiner of this type cannot be used for practical purposes, because the entire load which must be supported by the carabiner has to be transmitted through the pivot axis of the closing member. Accordingly, the pivot axis of the closing member would have to be dimensioned with the same strength as the hook portion itself, a requirement which up to now has not been structurally solved.

European Application 362,087 discloses a carabiner which includes a device for locking the closing member in the open position after the closing member has been pivoted into the open position. For this purpose, the portion of the hook member adjacent the free end of the hook member has on the inner side thereof a lever which essentially has the same shape as the hook portion adjacent the free end of the hook member and is pivotable about an axis extending perpendicularly to the plane of the hook member. The pivot axis of this lever is located near the free end of the hook member. In the unloaded state, this one-arm lever includes with the hook portion an acute angle and projects with its free end into the path of movement of the free end of the closing member and, as a result, holds the closing member in the open position thereof. When a rope is pulled into the hook, this rope pushes the one-arm lever downwardly and releases the closing member which has been in the open position, so that the closing member is pivoted into the closing position, however, without being locked in any way in this closing position.

SUMMARY OF THE INVENTION

Therefore, it is the primary object of the present invention to improve the carabiner of the above-described type in such a way that the closing member is automatically locked in its closing position when a load is applied to the carabiner, without requiring a special change of the structural configuration of the carabiner, and without impairing the load-bearing capability of the carabiner.

In accordance with the present invention, the lever mounted on the inner side of the hook portion adjacent the free end of the hook member is a two-arm lever whose arm adjacent the free end of the hook member rests against the hook member by means of the force of a spring when no load is applied to the carabiner. The end face of the two-arm lever extends close to the end of the closing member when the closing member is in the closing position. The other arm of the lever is spaced apart from the hook portion of the hook member located opposite this other arm. When the lever is pivoted against the force of the spring, the end face of the arm adjacent the free end of the hook member projects into the pivoting range of the free end of the closing member in the closing position thereof or rests against this free end.

Another object of the present invention is to make it possible to automatically maintain the closing member in its open position when no load is applied to the carabiner, until a load is applied to the carabiner. Only when the load is applied, the closing member is to be moved into the closing position and, moreover, the closing member is to be automatically maintained in this closing position.

In accordance with an advantageous feature of the present invention, this second object is met by constructing the two-arm lever in such a way that the end face of a curved arm of the lever projects into the pivoting range of the closing member, wherein the generating curve travelled by the pivotable closing member or the free end thereof during pivoting intersects the free end of the curved arm of the two-armed lever when no load is applied to the carabiner.

The various features of novelty which characterize the invention are pointed out with particularity in the claims annexed to and forming a part of the disclosure. For a better understanding of the invention, its operating advantages, specific objects attained by its use, reference should be had to the drawing and descriptive manner in which there are illustrated and described preferred embodiments of the invention.

BRIEF DESCRIPTION OF THE DRAWING

In the drawing:

FIG. 1 schematically illustrates a first embodiment of the carabiner according to the present invention;

FIGS. 2 and 3 are partial sectional views, on a slightly smaller scale, of the carabiner of FIG. 1, showing the two-armed lever in different positions of operation;

FIG. 4 is a sectional view taken along sectional line IV-IV of FIG. 1;

FIGS. 5–8 are sectional views, similar to FIG. 4, showing different cross-sectional shapes of lever and hook member;

DESCRIPTION OF THE PREFERRED EMBODIMENTS

Figure 9:
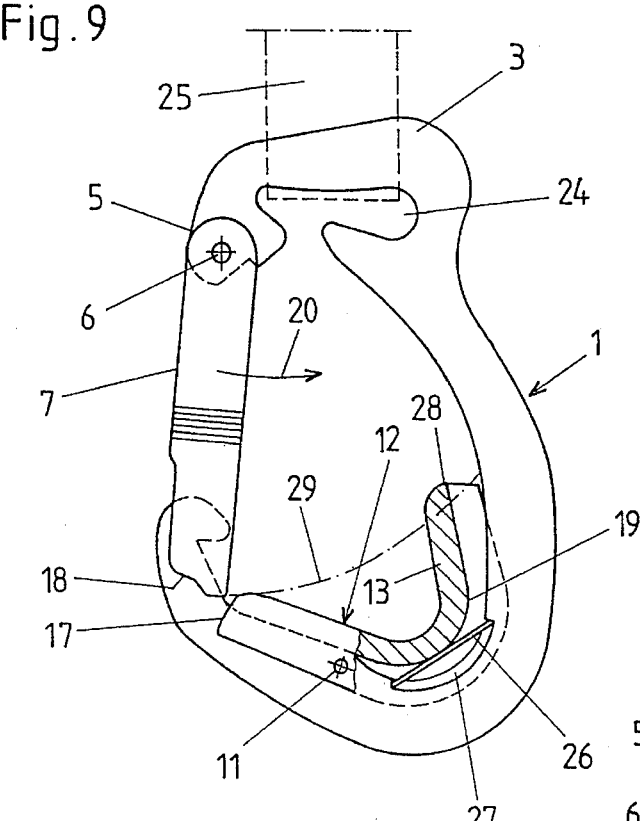
FIG. 9 illustrates another embodiment of the carabiner of the present invention.

As illustrated in FIG. 1 of the drawing, the first embodiment of the carabiner according to the present invention includes an essentially C-shaped hook member 1 which may be made of a flat material, as illustrated by the cross section at 2. The inner side of the upper curved portion 3 serves to receive a rope-like force transmitting member and has a bead-like inner increased thickness portion 4. A bolt-like closing member 7 is mounted at the upper end 5 of the hook portion 1. The closing member 7 is pivotable about an axis 6 which extends perpendicularly to the plane of the hook member 1, as indicated by arrow 20. In the closed position of the carabiner, the closing member 7 engages with its pivotable end over the free end 8 of the hook member 1 and rests against the free end 8 from the inside.

Starting from the position illustrated in FIG. 1, the closing member 7 can only be moved in the counter-clockwise direction. In the closed position illustrated in FIG. 1, the closing member 7 is held in this position by means of a spring, not shown, which interacts in the conventional manner by frictional engagement with the upper end 5 of the hook member 1.

The portion 9 of the hook member 1 adjacent the free end 8 of the hook member 1 is essentially straight and is followed by a curved portion 10 which serves to support and receive the second rope-like force transmitting member. A two-arm lever 12 is mounted on the inner side of the hook member 1 and in the area of the two above-mentioned portions 9 and 10. The two-arm lever 12 is shaped essentially corresponding to the two portions 9 and 10 of the hook member 1. The two-arm lever 12 is pivotable about an axis 11 which extends perpendicularly to the plane of the hook member 1. A bore 14 is provided on the inner side of the curved arm 13 of the two-arm lever 12. The bore 14 receives a helical spring 15 which rests with its other end against the inner side of the portion 10, as shown in FIG. 2 of the drawing. In the unloaded state of the carabiner, the spring 15 presses the straight arm 16 of the lever 12 against the oppositely located portion 9 of the hook member 1. The end face 17 of the straight arm 16 is located near the end face 18 of the closing member 7 when the closing member 7 is in the closing position shown in FIG. 1. The illustration of FIG. 2 corresponds to that of FIG. 1, however, the lever 12 is shown in section in order to illustrate the inner contour 19 of the two-arm lever 12. This contour 19 is identical to the bottom of the groove 23 which is formed on the outer side of the lever. In the illustrated embodiment, the lever is manufactured from a piece of round section.

When a second rope-like force transmitting member, illustrated in FIG. 3 by broken line 22, is introduced into the carabiner by pivoting the closing member 7 in the direction of arrow 20 of FIG. 1, and a load is applied on the carabiner in the direction of arrow 21 shown in FIG. 3, the force transmitting member acts on the curved arm 13 of the lever 12 and pivots the lever 12 against the force of spring 15 in clockwise direction until the lever 12 rests with its inner contour 19 against the curved portion 10 of the hook member 1, as shown in FIG. 3. As a result, the end face 17 of the straight arm 16 of the lever 12 is raised and, thus, is moved directly into the pivoting range 29 of the free end 19 of the bolt-like closing member 7, so that the pivoting movement of the closing member 7 is blocked. Consequently, the closing member 7 is automatically secured in its closing position by applying a load to the carabiner. The lever 12 is a bent piece of round section and the outer side of the curved arm of the lever 12 has a groove 23 for receiving the hook member 1 which is rectangular in cross-section, as illustrated in FIG. 4.

The cross-sectional shape of lever 12 and hook member 1 is not significant with respect to the present invention. Other possible configurations of the cross-sections are illustrated in FIGS. 5–8 which correspond to the configuration of FIG. 4 in principle.

Figure 10:
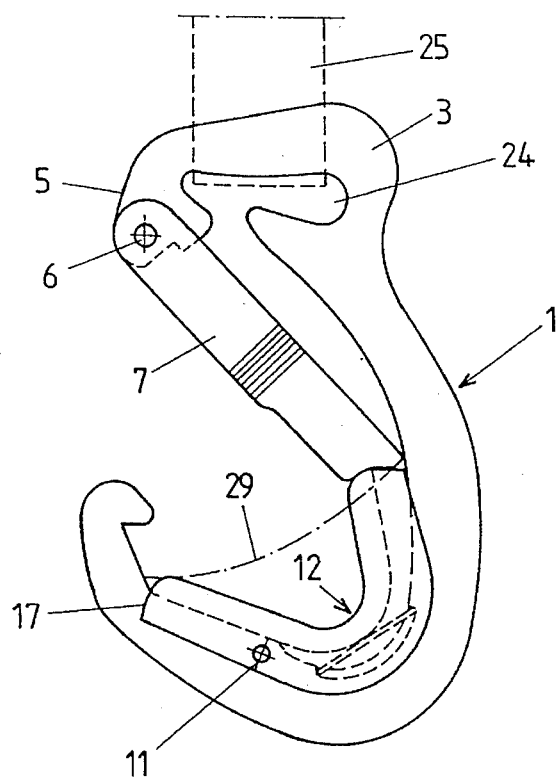
FIGS. 10 and 11 show the carabiner of FIG. 9 with the movable parts in different positions of operation.
Figure 11:
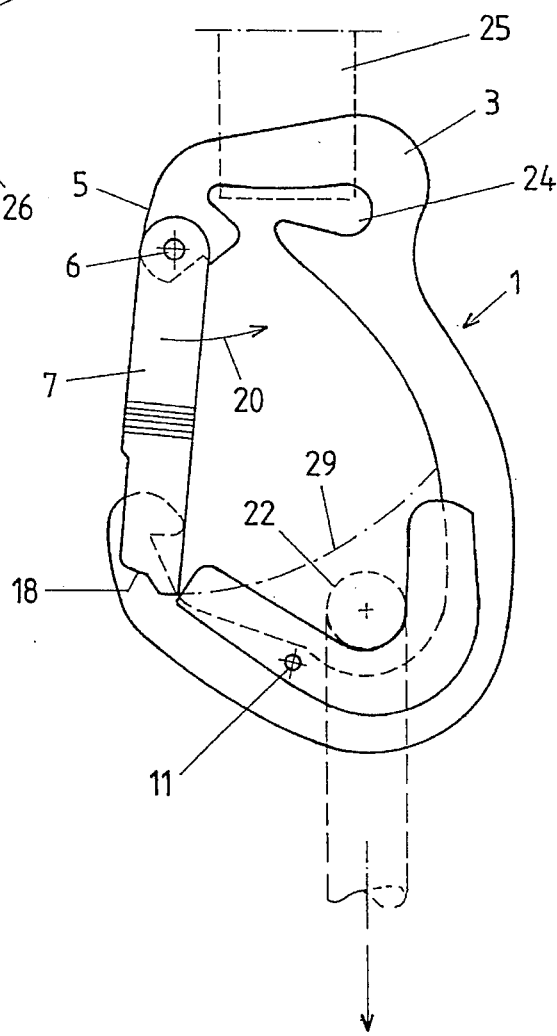

The second embodiment of the carabiner according to the present invention illustrated in FIGS. 9–11 essentially corresponds to the first embodiment and the same reference numerals have been used for denoting equivalent components.

In this embodiment, the upper curved portion 3 of the hook member 1 has an inwardly open T-shaped recess 24 for receiving a belt-type force transmitting member 25 which is indicated in FIGS. 9–11 by broken lines. The end face 18 of the bolt-like closing member 7 has a step. The spring provided in this embodiment is a flat spring 26 which is placed in a groove-like recess 27 at the inner side of the curved portion 10 of the hook member 1. The inner contour 19 of the curved arm 13 of the lever 12 rests against this flat spring 26. This arm 13 has such a length that, when no load is applied to the carabiner, the end face 28 of the arm 13 projects into the pivoting range 29 of the closing member 7. The free end 28 of the curved arm 13 of the two-arm lever 12 is conically inclined relative to the closing member. When the closing member 7 is pivoted into its open position shown in FIG. 10 when no load is applied to the carabiner, the stepped end face 18 of the closing member 7 makes contact with the conical inclined end 28 of the lever 12, so that the lever 12 is pivoted to some extent against the force of the flat spring 26 and is subsequently moved back into its original position, and the closing member 7 is held in a positively engaging manner in its open position illustrated in FIG. 10.

When a rope-like force transmitting member is inserted into the open carabiner and a load is subsequently applied to the carabiner, the rope-like force transmitting member travels immediately into the curved portion of the lever 12, so that the lever 12 is pivoted in clockwise position against the force of spring 26. This releases the closing member 7 which was in the open position, and the closing member 7 pivots back into its original position under the influence of a spring, not shown, mounted in the interior of the closing member 7. During the movement of the closing member 7, the closing member 7 travels over the free end 17 of the lever 12 before it reaches its own closing position in which the closing member 7 is now locked by the lever 12 which has been pivoted as a result of the load applied to the carabiner, as shown in FIG. 11 of the drawing.

The configuration according to the present invention makes it possible that the closing member 7 is automatically locked when a load is applied to the carabiner and the closing member 7 is automatically maintained open when no load is applied to the carabiner and that no manual or conscious acts are required by the user. Moreover, the load is absorbed directly by the hook member and no loads are applied to any of the pivot axes.

The invention is not limited by the embodiments described above which are presented as examples only but can be modified in various ways within the scope of protection defined by the appended patent claims.

I claim:

1. A carabiner comprising an essentially C-shaped load-bearing hook member extending in a plane and having a first end and a second free end, a closing member having a first free end and a second end attached to the first end of the hook member, the closing member being pivotable about the first end of the hook member in the plane of the hook member between an open position and a closing position, first spring means for biasing the closing member into the closing position in which the free end of the closing member rests against the free end of the hook member, the hook member comprising a hook portion at the free end thereof, the hook portion having an inner surface, a two-armed lever pivotally attached to the inner surface of the hook portion, the two-armed lever being pivotable about an axis extending perpendicularly to the plane of the hook member, the two-armed lever corresponding in shape essentially to the hook portion and comprising a first arm facing the free end of the hook member and a second arm facing away from the free end of the hook member, second spring means for biasing the lever into a first position in which the first arm of the lever rests against the inner surface of the hook portion and the second arm is spaced from the inner surface of the hook portion in the unloaded state of the carabiner, wherein, when the lever is pivoted against the force of the second spring means, an end face of the first arm of the two-armed lever projects into a pivoting range of the free end of the closing member when the closing member is in the closing position.

2. The carabiner according to claim 1, wherein the second arm of the two-arm lever and the portion of the hook member spaced from the second arm in the unloaded state of the carabiner have curved shapes which correspond to each other.

3. The carabiner according to claim 2, wherein the second arm of the two-arm lever has an end face, the closing member having a pivoting range, the end face of the second arm projecting into the pivoting range, wherein an envelope curve traveled by the free end of the closing member during pivoting thereof intersects the free end of the second arm of the two-arm lever in the unloaded state of the carabiner.

4. The carabiner according to claim 3, wherein the free end of the closing member has an end face, the end face of the free end of the closing member having at least one step, the end face of the free end of the second arm of the two-arm lever having at least one step corresponding in shape to the at least one step of the end face of the free end of the closing member, wherein the closing member is held in the open position by positive engagement of the end face of the free end of the closing member and the end face of the free end of the second arm of the two-arm lever.

5. The carabiner according to claim 4, wherein the free end of the curved second arm of the two-arm lever is conically inclined relative to the closing member.

6. The carabiner according to claim 2, wherein a side of the curved second arm of the two-arm lever facing the hook member defines a bore for receiving the first spring means, the second spring means being a helical spring having an end resting against the hook member.

7. The carabiner according to claim 1, wherein the first arm of the two-arm lever adjacent the free end of the hook member has an essentially straight shape.

8. The carabiner according to claim 1, wherein the two-arm lever is formed of a piece of round section, a groove being formed on an outer side of the lever for receiving the hook member which has a rectangular cross-section.

\* \* \* \* \*